United States Patent
Mashiko

(10) Patent No.: US 8,006,269 B2
(45) Date of Patent: Aug. 23, 2011

(54) BROADCASTING RECEIVING APPARATUS, METHOD FOR CONTROLLING BROADCASTING RECEIVING APPARATUS, BROADCASTING RECEIVING APPARATUS CONTROLLING PROGRAM, AND COMPUTER-READABLE RECORDING MEDIUM

(75) Inventor: Ryutaro Mashiko, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 162 days.

(21) Appl. No.: 10/592,094

(22) PCT Filed: Mar. 7, 2005

(86) PCT No.: PCT/JP2005/003897
§ 371 (c)(1),
(2), (4) Date: Sep. 7, 2006

(87) PCT Pub. No.: WO2005/086483
PCT Pub. Date: Sep. 15, 2005

(65) Prior Publication Data
US 2007/0143818 A1    Jun. 21, 2007

(30) Foreign Application Priority Data
Mar. 8, 2004  (JP) ................................. 2004-064014

(51) Int. Cl.
*H04N 7/16* (2006.01)
(52) U.S. Cl. ...... 725/62; 455/556.1; 455/3.02; 455/3.06
(58) Field of Classification Search ............... 725/63, 725/62; 455/575.3, 556.1, 3.02, 3.06
See application file for complete search history.

(56) References Cited

U.S. PATENT DOCUMENTS

| | | | | |
|---|---|---|---|---|
| 5,758,259 A | * | 5/1998 | Lawler | 725/45 |
| 5,850,218 A | * | 12/1998 | LaJoie et al. | 725/45 |
| 6,567,672 B1 | * | 5/2003 | Park et al. | 455/550.1 |
| 2001/0013122 A1 | | 8/2001 | Hirata | |
| 2002/0077079 A1 | * | 6/2002 | Ishihara | 455/410 |
| 2002/0094826 A1 | | 7/2002 | Lee | |
| 2003/0020744 A1 | * | 1/2003 | Ellis et al. | 345/723 |
| 2004/0029546 A1 | * | 2/2004 | Tsuchi et al. | 455/159.1 |

(Continued)

FOREIGN PATENT DOCUMENTS
JP     07-107056     *  4/1995
(Continued)

OTHER PUBLICATIONS

Operational Guidelines for Digital Terrestrial Television Broadcasting, ARIB Technical Report, ARIB TR-B14, Version 1.6, Jan. 24, 2002 (revised Feb. 5, 2004) pp. 4.204-4-208.

(Continued)

*Primary Examiner* — Scott Beliveau
*Assistant Examiner* — Nicholas T Corbo
(74) *Attorney, Agent, or Firm* — Birch, Stewart, Kolasch & Birch, LLP

(57) ABSTRACT

An information communication terminal apparatus allows a broadcasting signal transmitting side and a secondary service provider to provide a television service in consideration of a user's desired way of viewing. This is attained as follows. That is, a television receiving control section controls, in accordance with a predetermined broadcasting control command extracted by a data extracting section from data received by a data communication section, a television broadcasting receiving section such that the television broadcasting receiving section controls (start, halt, or carry out channel switching) reception of a broadcasting signal.

4 Claims, 10 Drawing Sheets

U.S. PATENT DOCUMENTS

| | | | |
|---|---|---|---|
| 2004/0056985 A1* | 3/2004 | Seong | 348/838 |
| 2004/0137940 A1* | 7/2004 | Matsunami | 455/550.1 |
| 2004/0181808 A1* | 9/2004 | Schaefer et al. | 725/89 |
| 2004/0192412 A1* | 9/2004 | Ono et al. | 455/574 |
| 2005/0020325 A1* | 1/2005 | Enger et al. | 455/575.3 |
| 2005/0028208 A1* | 2/2005 | Ellis et al. | 725/58 |
| 2007/0186241 A1* | 8/2007 | Sugimoto et al. | 725/46 |
| 2010/0138868 A1* | 6/2010 | Sie et al. | 725/46 |

FOREIGN PATENT DOCUMENTS

| | | |
|---|---|---|
| JP | 7-107056 A | 4/1995 |
| JP | 8-107510 A | 4/1996 |
| JP | 10-98686 A | 4/1998 |
| JP | 10-247345 A | 9/1998 |
| JP | 10-261251 A | 9/1998 |
| JP | 10-276421 A | 10/1998 |
| JP | 2000-138879 A | 5/2000 |
| JP | 2002-16889 A | 1/2002 |
| JP | 2002-64449 A | 2/2002 |
| JP | 2002-118793 A | 4/2002 |
| JP | 2002-354360 A | 12/2002 |
| JP | 2003-153111 A | 5/2003 |
| JP | 2003-517766 A | 5/2003 |
| JP | 2004-336227 A | 11/2004 |
| WO | WO 99/11065 A1 | 3/1999 |
| WO | WO 01/44905 A2 | 6/2001 |
| WO | WO 01/45386 A2 | 6/2001 |
| WO | WO 02087234 A2 * | 10/2002 |
| WO | WO 03/036969 A1 | 5/2003 |
| WO | WO 03/045064 A1 | 5/2003 |

OTHER PUBLICATIONS

Operational Guildines for Digital Terrestrail Television Broadcasting, ARIB Technical Report, ARIB TR-14, Version 1.6, Jan. 24, 2002 pp. 4.203-4.208.

Search Report for corresponding European Patent Appln. 05720169.1 dated May 4, 2010.

* cited by examiner

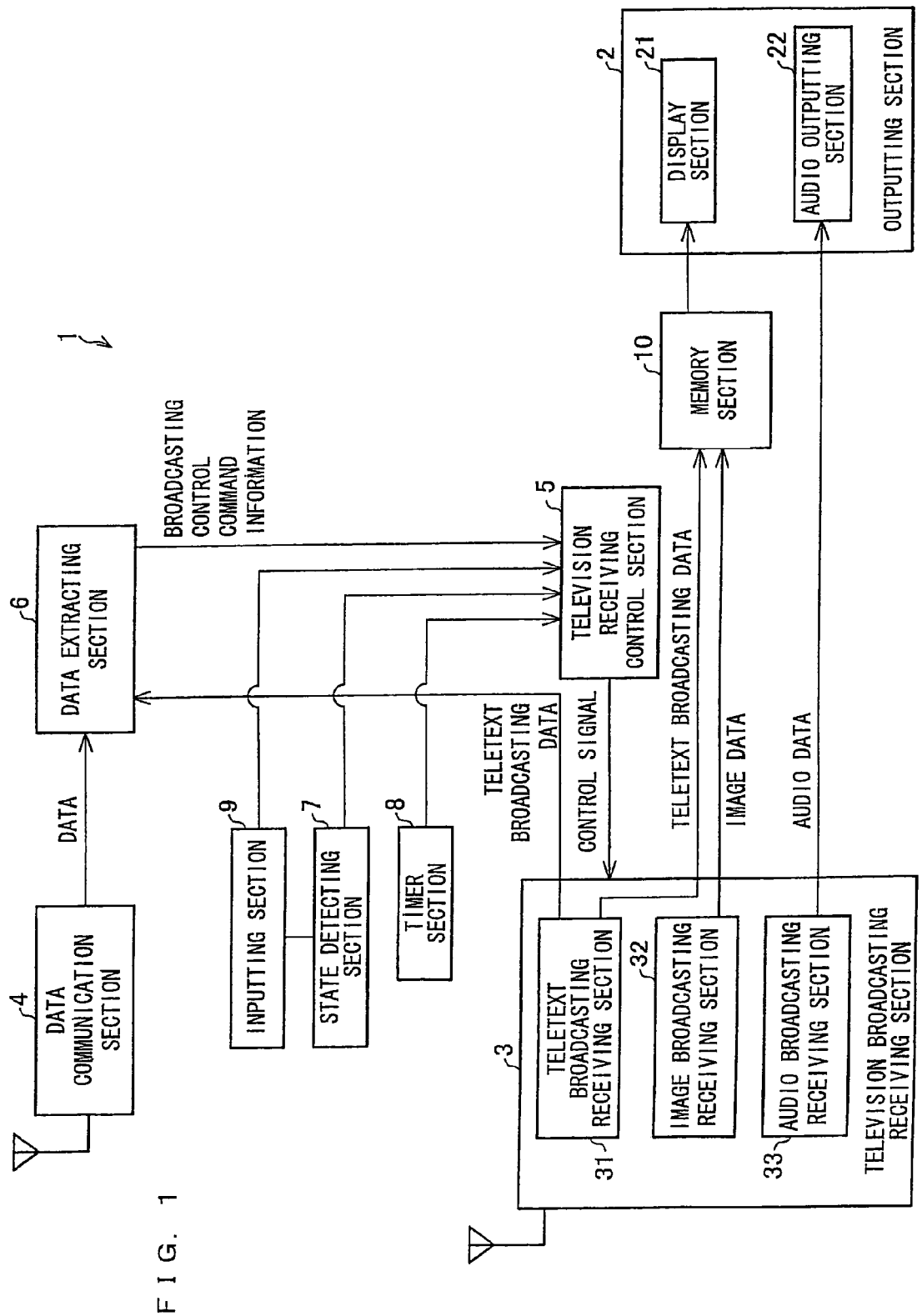

F I G. 1 0
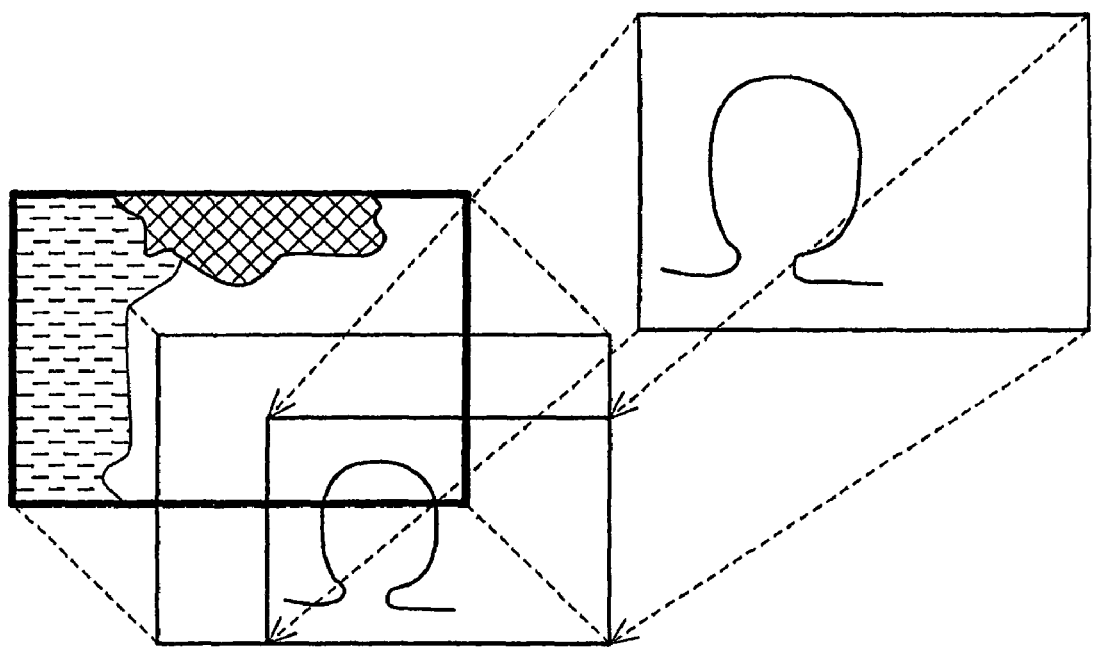

BROADCASTING RECEIVING APPARATUS, METHOD FOR CONTROLLING BROADCASTING RECEIVING APPARATUS, BROADCASTING RECEIVING APPARATUS CONTROLLING PROGRAM, AND COMPUTER-READABLE RECORDING MEDIUM

BACKGROUND OF THE INVENTION

1. Field of the Invention

The present invention relates to a mobile information communication terminal apparatus such as a mobile phone. More specifically, the present invention relates to (i) an information communication terminal apparatus having a television displaying function, (ii) a method for controlling the information communication terminal apparatus, (iii) an information communication terminal apparatus controlling program, and (iv) a computer-readable recording medium.

2. Description of the Related Art

Conventionally, a user carries out a predetermined operation with respect to a television (TV) broadcasting receiver so as to start television viewing or so as to switch to a channel of a broadcasting to be viewed.

For example, Patent document 1 (Japanese Unexamined Patent Publication Tokukaihei 08-107510/1996 (published on Apr. 23, 1996)) describes a TV broadcasting receiver in which channels are switched between each other every viewing time set for each of the channels. The channels and the viewing time are set by a user in the TV broadcasting receiver via a remote controller or the like.

Further, Patent document 2 (Japanese Unexamined Patent Publication Tokukai 2000-138879 (published on May 16, 2000)) describes a TV broadcasting receiver in which a program guide is displayed on a screen at such a timing that one broadcasting program is changed to another. With this, the user is urged to select a broadcasting program to be viewed.

In the meanwhile, in recent years, a mobile phone has been developed to have high performance in power-saving ability and image drawing ability. Such a high performance mobile phone is provided with various functions such as a camera function, a music playback function, an image playback function, and a game function. A function further given thereto is a function of receiving a TV broadcasting.

Such a TV broadcasting receiving function provided in the mobile phone will accommodate to not only conventional terrestrial analog broadcasting but also digital broadcasting including teletext broadcasting. Accordingly, a demand will arise in a mobile phone in which the television broadcasting receiving function and the data communication function are further integrated.

Here, a mobile information communication terminal apparatus, such as a mobile phone, having such a television broadcasting receiving function is made for mobile use, so that a display screen size thereof is smaller than that of a stationary television set. Moreover, viewing time is likely to be limited due to limitation of battery capacity. Further, TV viewing using the mobile information communication terminal apparatus is possibly different from traditional TV viewing in terms of the viewing time, viewing timing, and the like. Specifically, in the TV viewing using the mobile information communication terminal apparatus, only limited footages are likely to be viewed for a short period of time. Provided in view of this is (i) a new service different from the traditional TV service, or (ii) a service provided in consideration of a user's desired way of viewing using the mobile information communication terminal.

Such services are referred to as "secondary services". Each of the secondary services is considered as a side service while a service of broadcasting a television program is considered as a main service. A specific example of the secondary service is a service of providing information indicating start and/or end of reception of a television broadcasting; or a service of providing information for (i) scale enlarging/scale reducing of a television image, (ii) rotation of a displayed television image, (iii) frame combining with a television image, and the like.

The secondary service may be provided by a broadcasting station, i.e., be broadcasted from the broadcasting station as additional information. Alternatively, the secondary service may be provided by a service provider which provides a service completely different from broadcasting of a television program. In cases where a plurality of providers other than a broadcasting station provide such secondary services, various types of service will be possibly provided from the providers.

The present invention is made in light of the above problems, and its object is to provide an information communication terminal apparatus, an information communication terminal apparatus controlling method, an information communication terminal apparatus controlling program, and a computer-readable recording medium, each of which allows a television broadcasting signal transmitting side and a secondary service provider to provide a television service in consideration of a user's desired way of viewing.

SUMMARY OF INVENTION (1) To achieve the object, an information communication terminal apparatus according to the present invention includes: a broadcasting receiving section for receiving a broadcasting signal; an outputting section for outputting at least one of image data, audio data, and teletext broadcasting data in accordance with the broadcasting signal; a data communication means for carrying out data communication; a data extracting means for extracting a predetermined broadcasting control command from data received by the data communication means; and a broadcasting receiving control means for controlling the broadcasting receiving section in accordance with the broadcasting control command extracted by the data extracting means.

Further, a method, according to the present invention, for controlling an information communication terminal apparatus including an outputting section via which at least one of image data, audio data, and teletext broadcasting data is outputted in accordance with a broadcasting signal received by a broadcasting receiving section, the method includes the steps of: (A) receiving data from outside; (B) extracting a predetermined broadcasting control command from the data received in the step (A); and (C) controlling the broadcasting receiving section in accordance with the broadcasting control command.

According to the above structure and the above method, when the broadcasting control command is contained in the received data, the broadcasting receiving section can be controlled in accordance with the broadcasting control command. For example, the control can be carried out such that the broadcasting signal is received. In this case, at least one of the image data, the audio data, and the teletext broadcasting data is outputted to the outputting section without a user's operation, i.e., automatically.

In other words, according to the present invention, by sending the broadcasting control command from the broadcasting signal transmitting side, the broadcasting signal transmitting side can control the reception of the broadcasting in the information communication terminal apparatus. That is, the present invention allows expansion of possibility in the form of broadcasting. Thus, according to the above structure and the above method, it is possible to provide an information communication terminal apparatus which allows the broadcasting signal transmitting side and the secondary service provider to provide a television service in consideration of a user's desired way of viewing.

To achieve the object, an information communication terminal apparatus according to the present invention includes: a broadcasting receiving section for receiving a broadcasting signal; a display section for displaying image data in accordance with the broadcasting signal; data communication means for carrying out data communication; data extracting means for extracting a predetermined image converting command from data received by the data communication means; and image processing means for carrying out, in accordance with the image converting command, a converting process with respect to the image data to be displayed on the display section.

Further, a method, according to the present invention, for controlling an information communication terminal apparatus including a display section in which image data is outputted in accordance with a broadcasting signal received by a broadcasting receiving section, the method includes the steps of: (D) receiving data; (E) extracting a predetermined image converting command from the data received in the step (D); and (F) carrying out a converting process, in accordance with the image converting command, with respect to the image data to be displayed on the display section.

According to the above structure and the above method, when the image converting command is contained in the received data, the image data to be displayed on the display section can be converted in accordance with the image converting command.

In other words, according to the present invention, by sending the image converting command from the broadcasting signal transmitting side, the broadcasting signal transmitting side can cause the information communication terminal apparatus to carry out the converting process of the image data. That is, the present invention allows expansion of possibility in the form of broadcasting. Thus, according to the above structure and the above method, it is possible to provide an information communication terminal apparatus which allows the broadcasting signal transmitting side and the secondary service provider to provide a television service in consideration of a user's desired way of viewing.

Further, while providing identical television broadcasting programs, local broadcasting stations and the secondary service providers are allowed to provide their original broadcasting services. For example, in the same manner that a user of a mobile phone customizes ringing melodies, it is possible for the user of the information communication terminal apparatus to uniquely customize ways of receiving broadcastings, by arbitrarily combining provided broadcasting services.

The data to be received by the data communication means encompasses all the types of data that can be received by communication means provided in an information communication terminal apparatus such as a mobile phone. Specifically, the data to be received by the data communication means encompasses not only document data made up of a letter (character) and/or an image, but also a binary data row that cannot be converted into text data.

Note that the information communication terminal apparatus may be realized by a computer. In this case, the present invention includes (i) an information communication terminal apparatus controlling program which realizes, by way of a computer, the respective means provided in the above information communication terminal apparatus; and (ii) a computer-readable recording medium storing the information communication terminal apparatus controlling program.

According to the above structures, by causing a computer to read out and execute the information communication terminal apparatus controlling program, it is possible to realize the same effects as the effects exhibited by the above information communication terminal apparatus.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a block diagram illustrating a major structure of a mobile phone of one embodiment of the present invention.

FIG. 10 is a diagram illustrating one example of image data having been subjected to the image converting process and the image combining process in the mobile phone shown in FIG. 6.

DETAILED DESCRIPTION OF THE INVENTION

Embodiment 1

Figure 2:
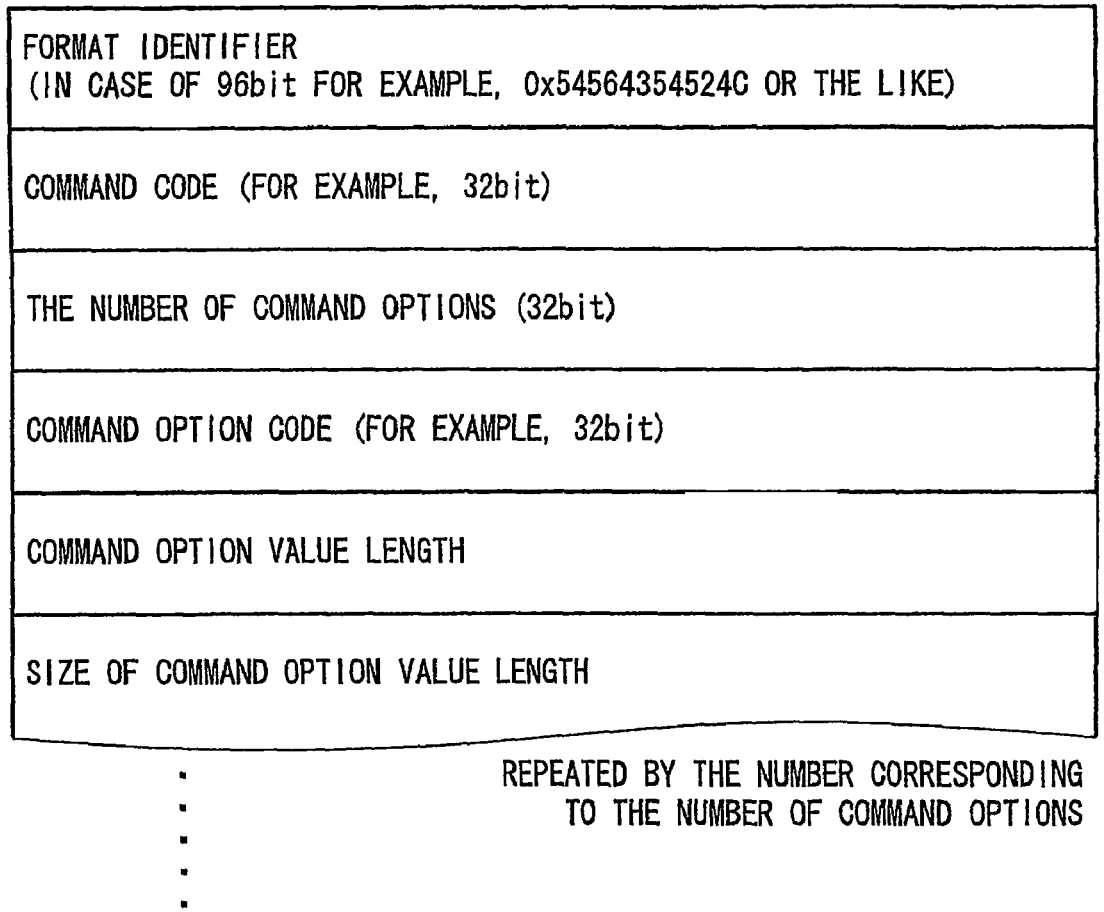
FIG. 2 is an explanatory diagram illustrating an example of a command to be extracted by a data extracting section of the mobile phone.

One embodiment of the present invention will be described below with reference to FIG. 1 through FIG. 5. Note that the present invention is applicable to any information communication terminal apparatus that can receive a broadcasting signal; however, each of the embodiments described below assumes that the present invention is applied to, e.g., a mobile phone including a receiving section that can receive a broadcasting signal of a terrestrial digital television broadcasting.

However, an information communication terminal apparatus of the present invention is not limited to this as long as the information communication terminal apparatus has a structure for receiving a television broadcasting signal. For example, the information communication terminal apparatus of the present invention may be (i) a mobile phone; (ii) a mobile terminal such as a PDA (Personal Digital Assistant), a PHS (Personal Handy-phone System), a laptop personal computer, a digital camera, a mobile digital video recorder, and an audio player; (iii) a personal computer; (iv) a videophone; (v) an Internet television; and the like. Further, the television broadcasting to be received by the information communication terminal apparatus of the present invention may be not only a terrestrial digital television broadcasting, but also an analog television broadcasting and a satellite broadcasting. Moreover, the television broadcasting may be replaced with an FM/AM radio broadcasting or the like. Further, the present invention is applicable to a structure which can receive some of the above broadcastings.

As shown in FIG. 1, a mobile phone (information communication terminal apparatus) 1 of the present embodiment includes an outputting section 2, a television broadcasting receiving section (broadcasting receiving section) 3, a data communication section (data communication means) 4, a television receiving control section (broadcasting receiving control means) 5, a data extracting section 6, a state detecting section (apparatus state detecting section) 7, a timer section (time measuring section) 8, an inputting section 9, and a memory section 10.

The outputting section 2 outputs data in accordance with a broadcasting signal received by the television broadcasting receiving section 3. The outputting section 2 includes a display section 21 and an audio outputting section 22. The display section 21 displays image data and teletext broadcasting data, and the audio outputting section 21 outputs audio data. Note that the display section 21 can display (i) an image, (ii) mail data received by the data communication section 4 and including an image, and (iii) the like, and the audio outputting section 22 can output audio data obtained through communication; however, no further explanation thereof will be made in the present embodiment.

The television broadcasting receiving section 3 is a broadcasting signal receiving interface for receiving a broadcasting signal of the terrestrial digital television broadcasting via a tuner. The television broadcasting receiving section 3 includes a teletext broadcasting receiving section 31, an image broadcasting receiving section 32, and an audio broadcasting receiving section 33. The teletext broadcasting receiving section 31 receives teletext broadcasting data contained in the television broadcasting signal. The image broadcasting receiving section 32 receives image data contained in the broadcasting signal. The audio broadcasting receiving section 33 receives an audio signal contained in the broadcasting signal.

The data communication section 4 is connected to a network (communication network) via an antenna, and is an data transmitting/receiving interface for transmitting and receiving, to and from outside, (i) document data made up of a letter (character) and/or an image, (ii) telephone data concerning a telephone function, and (iii) data such as a control signal.

The television receiving control section 5 controls the television broadcasting receiving section 3 such that the television broadcasting receiving section 3 receives the terrestrial digital broadcasting. The control is carried out in accordance with at least either one of (i) a broadcasting control signal sent from the data communication section 4 and (ii) an inputting operation carried out via the inputting section 9.

The data extracting section 6 extracts a broadcasting control command from the data received by the data communication section 4, in cases where the data received by the data communication section 4 contains the broadcasting control command. Extracted in the present embodiment is (i) a broadcasting starting command for instructing start of reception of a television broadcasting, (ii) a broadcasting halting command for instructing halt of reception of a television broadcasting, or (iii) a broadcasting switching command for instructing switching from one broadcasting channel to other broadcasting channel such that a broadcasting signal of the other broadcasting channel is received. However, the aforementioned control command is not limited to these. Then, the data extracting section 6 transmits, to the television receiving control section 5, broadcasting control command data obtained in accordance with the broadcasting control command.

The data to be received by the data communication section 4 encompasses all the types of data that can be received by communication means provided in an information communication terminal apparatus such as a mobile phone. Specifically, the data encompasses not only document data made up of a letter (character) and/or an image, but also a binary data row that cannot be converted into text data.

Examples of the document data include (i) mail data, (ii) hypertext data such as HTML and XML, (iii) other data compliant with a special format, and the like. However, the document data is not particularly limited as long as the document data is made up of a letter (character) and/or an image.

The following explains examples of the broadcasting control command contained in the communication data. Assume that the broadcasting control command herein is, e.g., instruction information for activating a television function such that a broadcasting signal is received.

Firstly explained is an example of the broadcasting control command used in cases where the data to be received by the data communication section 4 is mail data. In this case, for example, a combination of a [mail header tag] character string and a [control command] can be used as the broadcasting control command. Further, an additional parameter may be added in the broadcasting control command as an option (command option) and be separated from the control command by a symbol such as ";".

Such a broadcasting control command is specifically expressed, for example, as follows: "X-TV-Control: start; ch=508". The "X-TV-Control" coming first in the broadcasting control command indicates that the mail data is a broadcasting control command. In addition, according to regulations such as RFC822, a mail header portion is supposed to use a character string starting with "X-". Coming after ":" is the control command which specifies control to be carried out next. In this case, "start" for instructing start of reception of a television broadcasting is described. Coming after ";" is the additional parameter. In this case, "ch=508", which indicates that the channel number of the television broadcasting to be received is 508, is added.

Thus, the above broadcasting control command "X-TV-Control: start; ch=508" is such an instruction as to "start receiving the television broadcasting of the channel whose number is 508". When receiving data having a mail header portion in which such a broadcasting control command (header data in this case) is provided, the mobile phone 1 starts receiving the television broadcasting of the channel whose number is 508. That is, the data extracting section 6 analyzes the broadcasting control command in accordance with the above rule. Specifically, when the data extracting section 6 searches a character string in the mail data and detects the character string "X-TV-Control:" in the mail, the data extracting section 6 judges that this is a broadcasting control command, and acquires information (broadcasting control command data) coming after the "X-TV-Control:", and transmits the information to the television receiving control section 5. In accordance with the information thus received, the television receiving control section 5 controls the television broadcasting receiving section 3.

Examples of the control command are described as follows, but the control command is not limited to these:

Television broadcasting reception start: start
Television broadcasting reception end: end
Television channel change: change#ch Further, an example of the command option is described as follows, but the command option is not limited to this:

Channel number: [ch=]+[channel number]

Alternatively, a command tag exemplified as follows may be added in the mail body portion:

"2004-01-20-TV-Control: start; ch=508"

Alternatively, the control may be carried out with the use of a multi-part mail having a part in which a MIME-type for the television control is defined and which is handled as a television control part. One multi-part mail can be divided into a plurality of parts, and the parts can respectively store data having different formats from one another. Such data formats are each defined by a header "Content-Type". A value set in the Content-Type is termed the MIME-type. By defining a part of the multi-part mail as a MIME-type part used only for control of reception of a television broadcasting, the part can be recognized as a part for controlling the reception of the television broadcasting. Such a multi-part mail allows description having a higher degree of freedom as compared with the mail header, so that control having a high degree of freedom can be carried out. The mail header, the multi-part mail, and the like are defined by RFC (Request For Comments). As to the mail header, see RFC822. As to the multi-part mail, see RFC2045 and RFC2046.

Explained next is an example of the broadcasting control command used in cases where the data to be received by the data communication section 4 is data compliant with the hypertext. Adopted in the hypertext is, e.g., a description such as: [<]+[command tag]+[ ]+[control command]+[ ]+[command option][>]. As is the case with the above mail data, a service is defined by such a description format made up of the [command tag] character string, the [control command], and the [command option], and the description is used as the broadcasting control command. Such a broadcasting control command is specifically expressed as <TVCONTROL START CH=508>, which represents such an instruction as to "start receiving the television broadcasting of the channel number 508".

Explained next is an example of the broadcasting control command used in cases where the data to be received by the data communication section 4 is data compliant with a special data format. Such data compliant with a special data format may not be a text data that can be processed with ease, but may be a binary control data having a small data size. Such binary control data is quite likely to be in compliant with a completely fixed format. As an example of the broadcasting control command, see a binary data row shown in FIG. 2.

A command code for specifying control to be carried out is exemplified as follows:

Television broadcasting receiving start: 0x00000001
Television broadcasting receiving end: 0x0000002
Television channel change: 0x0000003

However, the command code is not limited to these.

In the meanwhile, see the following example of a command option:

Channel number: 0x000001FC (32 bit data or the like)

However, the command option is not limited to this.

Note that the above description merely indicates the examples of the broadcasting control command, and the broadcasting control command is not limited to these examples. Further, in the present embodiment, the specific character string is judged as a broadcasting control command as described above. However, for example, an image such as a two-dimensional barcode may be analyzed and it may be judged whether or not the image is a broadcasting control command.

Instead of the aforementioned data to be received by the data communication section 4, the teletext broadcasting data to be received by the teletext communication receiving section 31 of the television broadcasting receiving section 3 can be used. In this case, the data extracting section 6 extracts the broadcasting control command from the teletext broadcasting data.

The state detecting section 7 detects a current state of the mobile phone 1. For example, consider a case where the mobile phone 1 is foldable. In this case, the state detecting section 7 detects whether the body of the mobile phone 1 is folded or unfolded. Further, the state detecting section 7 may detect whether or not a user carries out an inputting operation via the input section 9.

The timer section 8 is a Real Time Clock (RTC) for measuring time. The timer section 8 determines whether or not a predetermined time set in advance has passed.

The inputting section 9 is an inputting device for receiving an inputting operation carried out by the user. Examples of the inputting device include a button switch, a touch panel, and the like. Such an inputting device is provided for the sake of the user's inputting operation. By using the inputting section 9, the user can carry out various types of inputting operation with respect to the mobile phone 1 of the present embodiment.

The memory section 10 is, e.g., a video memory (VRAM) or the like, and stores (i) the teletext broadcasting data received by the teletext broadcasting receiving section 31, and (ii) the image broadcasting data received by the image broadcasting receiving section 32. The data thus stored in the memory section 10 is reflected on the display section 21 at a constant interval, e.g., at a constant fresh rate. Alternatively, the data therein may be reflected on the display section 21 at such a timing that updating of the memory section 10 is finished. Note that: the meaning of the wording "reflect" is to display, on the display section 21, the data that are stored in and read out from the memory section 10 and that are to be displayed on pixels of the display section 21. The displaying is attained by carrying out an ON/OFF operation for voltage application onto data matrix of R, G, B, and the like.

Further, the mobile phone 1 includes members required to operate as a phone, such as a microphone for use in sound inputting.

Figure 3:
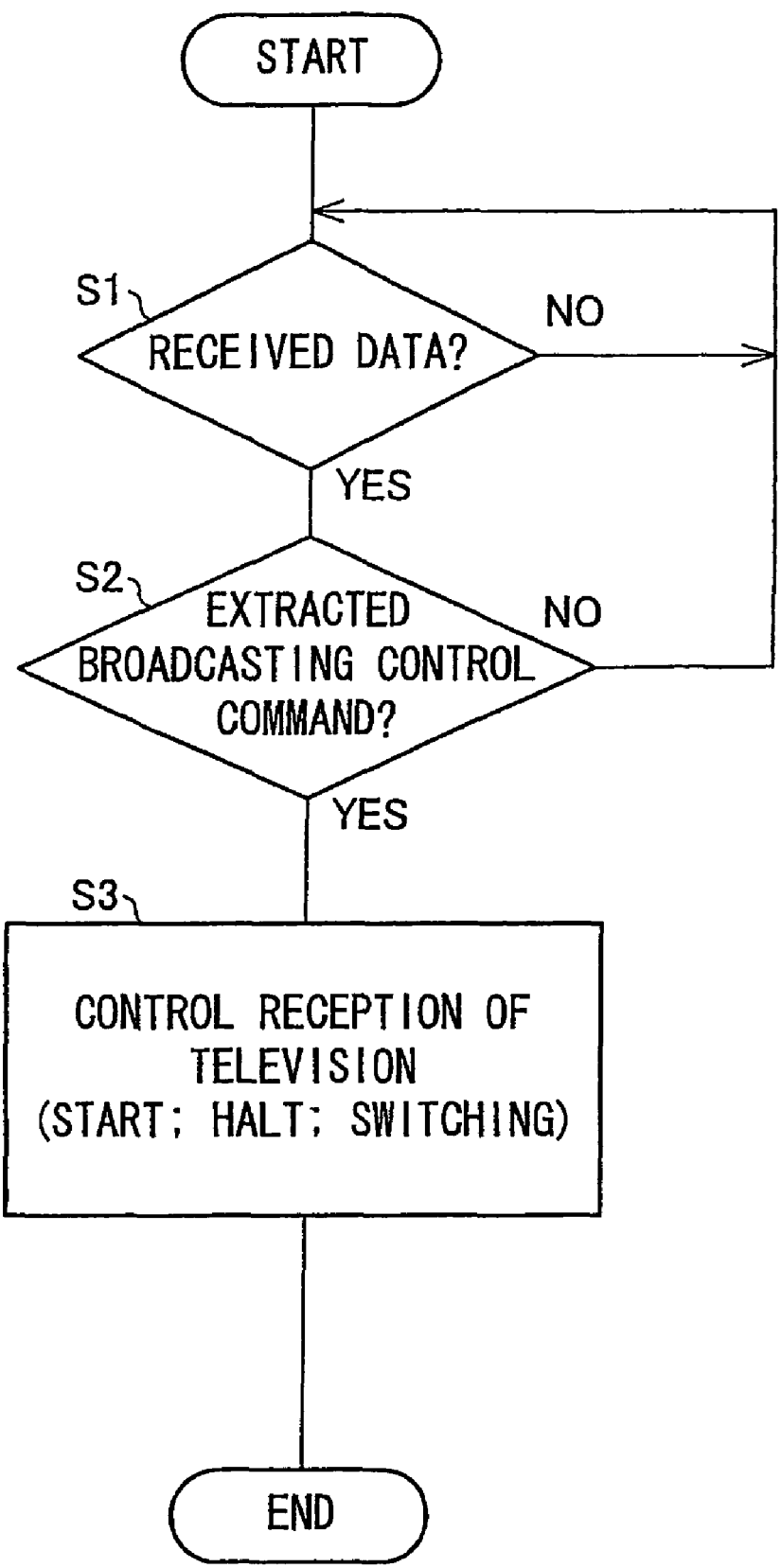
FIG. 3 is a flowchart illustrating process steps of controlling reception of a television broadcasting in the mobile phone.
Figure 4:
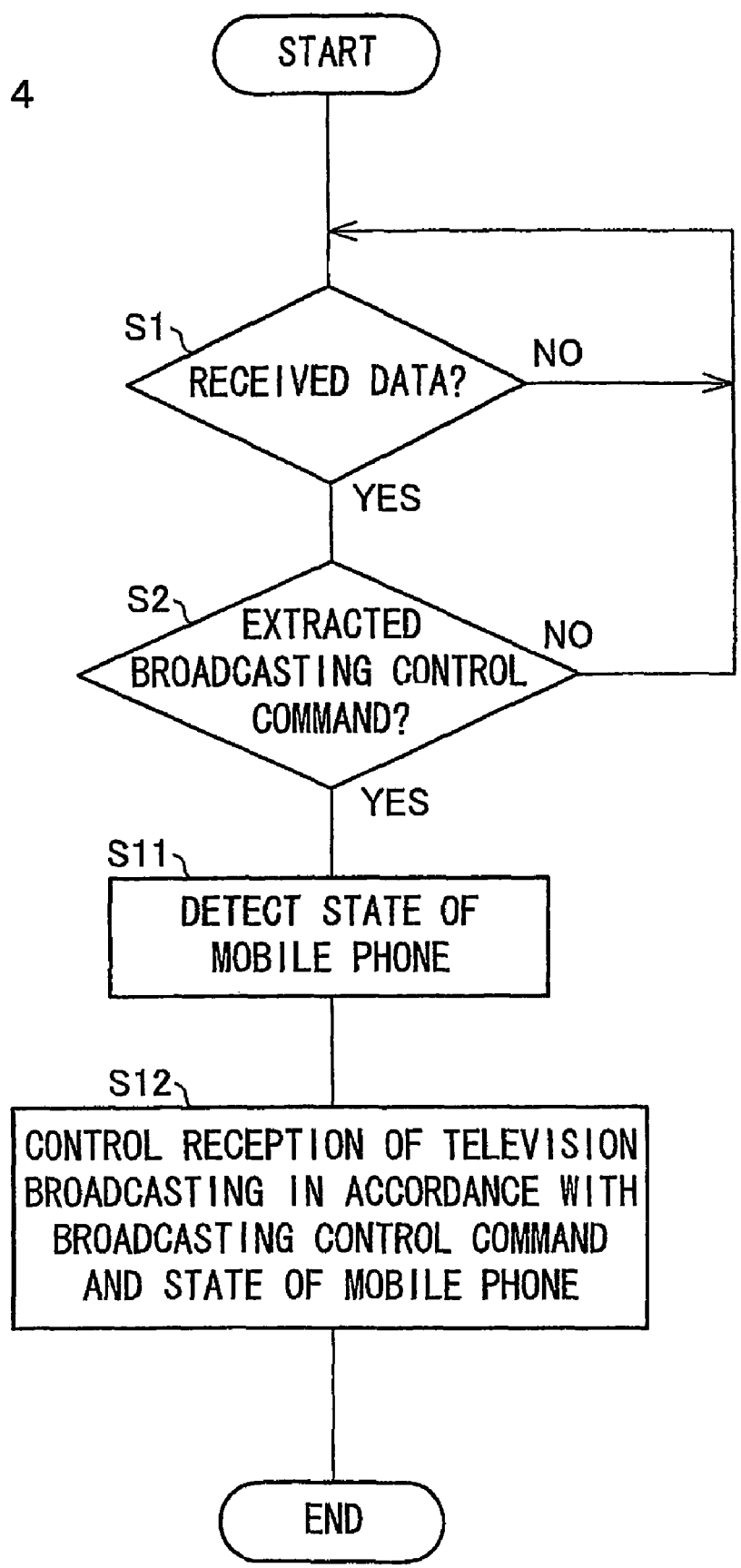
FIG. 4 is a flowchart illustrating process steps of controlling reception of a television broadcasting in the mobile phone.
Figure 5:
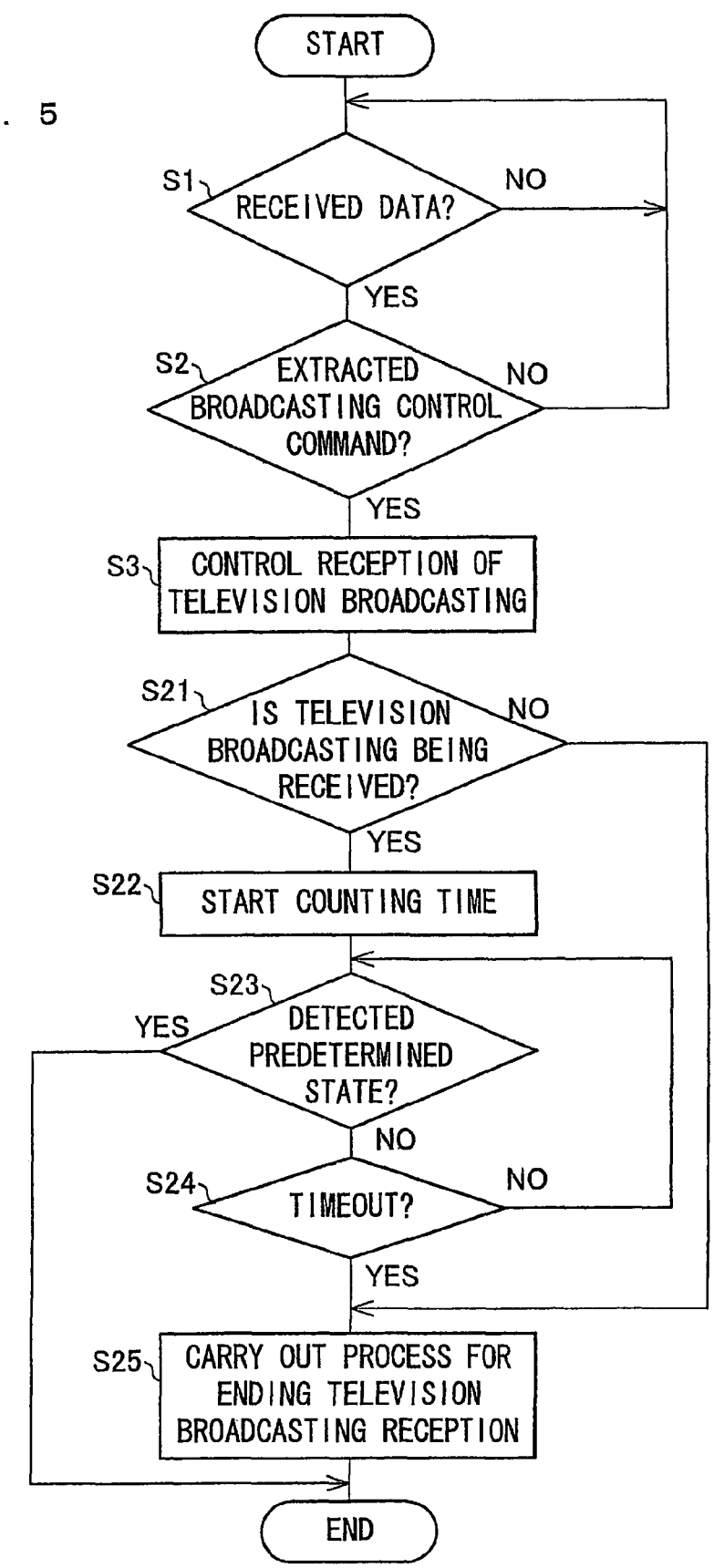
FIG. 5 is a flowchart illustrating process steps of controlling reception of a television broadcasting in the mobile phone.
Figure 6:
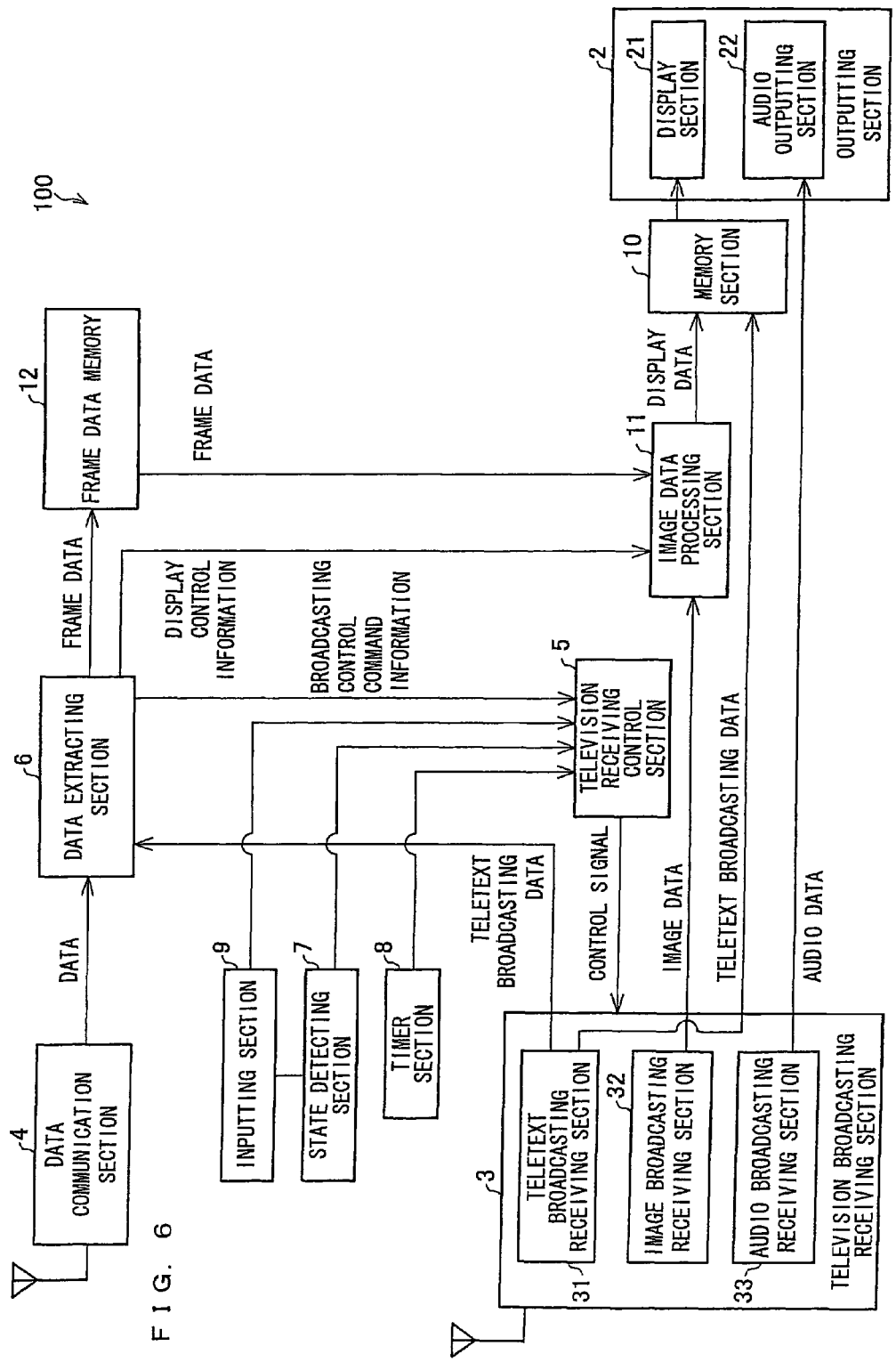
FIG. 6 is a block diagram illustrating a major structure of a mobile phone according to another embodiment of the present invention.

Next, with reference to a flowchart shown in FIG. 3, the following explains a flow of processes carried out by the mobile phone 1 so as to control reception of a television broadcasting.

Firstly, carried out in Step 1 (hereinafter, abbreviated as "S1") is judgment whether or not the data communication section 4 has received data. In cases where the data communication section 4 has not received any data (NO in S1), the data communication section 4 waits until data is received, i.e., the data communication section 4 maintains to be in a communicable state. In cases where the data communication section 4 has received data (YES in S1), the sequence goes to the next step S2.

In S2, the data extracting section 6 extracts a broadcasting control command from the data received in S1. In cases where the data has no broadcasting control command, or in cases where the data has a broadcasting control command but the broadcasting control command cannot be extracted (NO in S2), the data communication section 4 waits until another data is received. In cases where a broadcasting control command is extracted from the data in S2 (YES in S2), the sequence goes to the next step S3.

In S3, the reception of the television broadcasting is controlled in accordance with the broadcasting control command extracted in S2. This is specifically explained as follows. That is, in cases where the broadcasting control command extracted in S2 is a broadcasting starting command for instructing start of reception of a television broadcasting, the television receiving control section 5 controls the television broadcasting receiving section 3 such that the television broadcasting receiving section 3 starts receiving the television broadcasting. As a result, the television broadcasting receiving section 3 receives a television broadcasting signal, and image data (or teletext broadcasting data) is displayed on the display section 21, and sound is outputted from the audio outputting section 22.

On the other hand, in cases where the broadcasting control command extracted in S2 is, e.g., a broadcasting halting command for instructing halt of reception of a television broadcasting, the television receiving control section 5 controls the television broadcasting receiving section 3 such that the television broadcasting receiving section 3 halts the reception of the television broadcasting. In the meanwhile, in cases where the broadcasting control command extracted in S2 is, e.g., a broadcasting switching command for instructing switching to a television broadcasting channel, the television receiving control section 5 controls the television broadcasting receiving section 3 such that the television broadcasting channel is switched. As a result, the television broadcasting receiving section 3 receives a television broadcasting of the relevant channel.

As such, the above description deals with the flow of the television broadcasting reception control carried out in accordance with the broadcasting control command. In accordance with such a flow, the mobile phone 1 of the present embodiment can start receiving a television broadcasting, can halt receiving a television broadcasting, and can carry out channel switching without user's operations. In other words, the mobile phone 1 can carry out these processes automatically.

In the above example, the start of viewing the television broadcasting, the halting of viewing the television broadcasting, the channel switching, or the like is carried out automatically. However, in order to cause the user to confirm that each of these processes is to be carried out automatically, a notifying function using a sound, a vibrator, or the like may be activated at such a timing that the process is automatically carried out.

Further, a step of finding a current state of the mobile phone 1 may be added in the above flow. The following explains a flow, in which the step of finding the current state is added, of the television broadcasting reception control carried out by the mobile phone 1. The explanation is made with reference to a flowchart shown in FIG. 4.

Steps S1 and S2 in this flow are the same as S1 and S2 in the foregoing flow, so that they are respectively rendered the same step numbers. No explanation will be made for the steps. In cases where a broadcasting control command is extracted in S2 (YES in S2), the sequence goes to the next step S11.

In S11, the state detecting section 7 detects a current state of the mobile phone 1. In this flow, the mobile phone 1 is assumed to be a foldable mobile phone, and the state detecting section 7 detects, e.g., whether the body of the mobile phone 1 is folded or unfolded. Then, the sequence goes to S12.

In S12, the television broadcasting reception is controlled in accordance with (i) the broadcasting control command extracted in S2 and (ii) the mobile phone 1's current state detected in S11 (in other words, whether or not the mobile phone 1 is in a predetermined state).

This is specifically explained as follows. That is, in cases where the broadcasting control command extracted in S2 is, e.g., a broadcasting starting command for starting reception of a television broadcasting and where it was detected in S11 that the body of the mobile phone 1 is currently folded, the television receiving control section 5 controls the television broadcasting receiving section 3 such that the television broadcasting receiving section 3 does not start receiving the television broadcasting. In contrast, in cases where the broadcasting control command extracted in S2 is a broadcasting starting command and where it was judged in S11 that the body of the mobile phone 1 is currently unfolded, the television receiving control section 5 controls the television broadcasting receiving section 3 such that the television broadcasting receiving section 3 starts receiving the television broadcasting.

Further, in cases where the broadcasting control command extracted in S2 is, e.g., a broadcasting switching command and where it was detected in S11 that the body of the mobile phone 1 is currently folded, the reception of the television broadcasting is halted. Further, in cases where the broadcasting control command extracted in S2 is, e.g., a broadcasting switching command and where it was detected in S11 that the body of the mobile phone 1 is currently unfolded, channel switching is carried out and a television broadcasting of the switched channel is received.

Further, in cases where the broadcasting control command extracted in S2 is, e.g., a broadcasting halting command, the reception of the television broadcasting is halted irrespective of the current state of the mobile phone 1, which current state was detected in S11. Now, the series of processes are ended. Note that the process to be carried out in accordance with the broadcasting halting command may be changed according to the state of the mobile phone 1, which state was detected in S11. For example, when the broadcasting halting command is extracted and the body of the mobile phone 1 is folded, the reception of the television broadcasting is halted. On the other hand, when the broadcasting halting command is extracted and the body thereof is unfolded, a message is displayed on a screen or is acoustically provided so as to notify the user that the reception of the television broadcasting is to be halted. In response to the notification, the user may send, from the mobile phone 1 to a service provider or the like, an instruction for continuing the reception of the television broadcasting.

Note that, in S11, the state detecting section 7 may detect, as a current state of the mobile phone 1, whether or not the user carries out an inputting operation with respect to the inputting section 9, for example.

In this case, the following process is carried out in S12, for example. That is, in cases where the broadcasting control command extracted in S2 is, e.g., a broadcasting starting command for starting reception of a television broadcasting and where it was detected in S11 that an inputting operation is currently being carried out with respect to the mobile phone 1, the television receiving control section 5 controls the television broadcasting receiving section 3 such that the television broadcasting receiving section 3 does not start receiving the television broadcasting. Alternatively, in this case, the television receiving control section 5 does not send, to the television receiving section 3, a reception starting instruction obtained in accordance with the broadcasting starting command. Further, in cases where the broadcasting control command extracted in S2 is, e.g., a broadcasting starting command for instructing start of reception of a television broadcasting and where it was judged in S11 that no inputting operation is currently being carried out with respect to the mobile phone 1, the television receiving control section 5 controls the television broadcasting receiving section 3 such that the television broadcasting receiving section 3 starts receiving the television broadcasting.

In cases where the state detecting section 7 detects that an inputting operation is done after starting the reception of the television broadcasting, the television receiving control section 5 may control the television broadcasting receiving section 3 such that the television broadcasting receiving section 3 halts the reception of the television broadcasting.

The detection of the current state of the mobile phone 1 in S11 is not limited to the above. For example, both the aforementioned detections may be carried out: (1) whether the mobile phone 1 is folded or unfolded, and (2) whether or not an inputting operation is carried out. Then, the control in S12 may be carried out in accordance with a combination of the detections.

Further, a step of measuring time during which a television broadcasting has been received may be added in the flow explained with reference to FIG. 3. The following explains a flow, in which the step of measuring the time is added, of the television broadcasting reception control carried out by the mobile phone 1. The explanation is made with reference to a flowchart shown in FIG. 5.

Steps S1, S2, and S3 in this flow are the same as S1, S2, and S3 in the foregoing flow, so that they are respectively rendered the same step numbers. No explanation will be made for the steps. Control of reception of a television broadcasting is carried out in S3, and the sequence goes to the next step S21.

In S21, for example, the television broadcasting receiving section 3 judges whether or not a television broadcasting is being received. Here, in cases where control for halting reception of a television broadcasting was carried out in S3, it is judged in S21 that no television broadcasting is being received. In cases where it is judged in S21 that no television broadcasting is being received (NO in S21), the sequence goes to S25, which is described later. On the other hand, in cases where control was carried out in S3 such that reception of a television broadcasting started, or in cases where control was carried out in S3 such that channel switching was carried out and a television broadcasting of the channel was received, it is judged in S21 that the television broadcasting is being received. In cases where it is judged that a television broadcasting is being received (YES in S21), the sequence goes to S22.

In S22, the timer section 8 starts measuring time. Then, the sequence goes to S23.

In S23, it is judged whether or not the state detecting section 7 has detected whether or not the mobile phone 1 is in a predetermined state. In this case, it is judged that the state detecting section 7 has detected, e.g., whether or not the body of the mobile phone 1 is unfolded. In cases where the state detecting section 7 has detected in S23 that the body of the mobile phone 1 is unfolded (YES in S23), the process ends, i.e., the reception of the television broadcasting continues. In cases where the state detecting section 7 has not detected in S23 that the body thereof is unfolded (has detected that the body is folded) (NO is S23), the sequence goes to S24.

In S24, the timer section 8 judges whether or not a given period of time has passed since the start of the time measurement. In other words, the timer section 8 judges whether or not timeout has occurred. The given period may be set in advance by either the mobile phone 1 or the user. In cases where it is judged in S24 that the given period has passed, i.e., that the timeout has occurred (YES in S24), the sequence goes to S25. In cases where no timeout has occurred (NO in S24), the sequence repeats from S23.

Carried out in S25 is a process for ending the reception of the television broadcasting. That is, the television receiving control section 5 controls the television broadcasting receiving section 3 such that the television broadcasting receiving section 3 halts the reception of the television broadcasting. Now, the series of processes are finished.

According to the above flow, when a television broadcasting is being received but the body of the mobile phone 1 is folded, the reception of the television broadcasting will be ended after passage of a given period of time. In contrast, the reception of the television broadcasting continues as long as the body of the mobile phone 1 is unfolded.

In S23, it is judged whether or not the state detecting section 7 has detected whether or not the mobile phone 1 is in a predetermined state, but the predetermined state is not limited to the above. For example, it may be judged whether or not an inputting operation has been carried out via the inputting section 9. In this case, the reception of the television broadcasting continues if an inputting operation is carried out. If no inputting operation is carried out, the reception of the television broadcasting will be finished after passage of a given period of time.

Embodiment 2

The following description deals with another embodiment of the present invention with reference to FIG. 6 through FIG. 9. For ease of explanation, materials having the equivalent functions as those shown in the drawings pertaining to Embodiment 1 will be given the same reference symbols, and explanation thereof will be omitted here.

A mobile phone 100 of the present embodiment has a structure obtained by adding an image data processing section 11 and a frame data memory (combining image memory section) 12 to the structure of the mobile phone 1 of Embodiment 1.

Further, the data extracting section 6 of the foregoing mobile phone 1 extracts the broadcasting control command (the broadcasting starting command, the broadcasting halting command, or the broadcasting switching command) from the data received by the data communication section 4. Further extracted by the mobile phone 100 of the present embodiment is either an image converting command or an image combining command. The image changing command is a command for instructing conversion of image data. The image combining command is a command for instructing combining of image data with frame data.

Now, examples of the image converting command and the image combining command are explained.

See the following respective examples (1) and (2) of the image converting command and the image combining command each used in cases where the data to be received by the data communication section 4 is mail data: (1) X-TV-Control: reduction; scale=2, and (2) X-TV-Control: compound; filename="abcdef.png". The image converting command X-TV-Control: reduction; scale=2 is such an instruction as to "reduce the size of the television image data to half". The image combing command X-TV-Control: compound; filename="abcdef.png" is such an instruction as to "combine the television image data with frame data having a filename abcdef.png".

Further, a specific example of the image converting command used in cases where the data to be received by the data communication section 4 is data described in the hypertext is: <TVCONTROL REDUCTION SCALE=2>.

Further, a binary data row shown in FIG. 2 represents an example of each of the image changing command and the image combining command each used in cases where the data to be received by the data communication section 4 is data compliant with a special data format.

A command code is exemplified as follows:
Image size-reduction display: 0x00000004
Frame combining: 0x00000005
Note that the command code is not limited to these.
Further, a command option is exemplified as follows:
Reduction scale: 0x000000F0 (32 bit data or the like)
Combining filename: "abcdef.png" (Character string data)
Note that the command option is not limited to these.

Note that the aforementioned image converting command and the image combining command are mere examples, so that the image converting command and the image combining command are not limited to these. Further, in the present embodiment, the specific character string is judged as an image changing command or an image combining command as described above. However, for example, an image such as a two-dimensional barcode may be analyzed and it may be judged whether or not the image is either an image changing command or an image combining command.

Note that, instead of the data to be received by the data communication section 4, teletext data to be received by the teletext broadcasting receiving section 31 of the television broadcasting receiving section 3 can be used. In this case, the data extracting section 6 extracts the broadcasting control command from the teletext broadcasting data.

The image data processing section (image processing means) 11 carries out a converting (image converting) process with respect to image data received by the image broadcasting receiving section 32. Then, the image data processing section 11 sends, to the memory section 10, the image data thus having been subjected to the converting process. The following specifically explains the converting process.

When the data extracting section 6 extracts an image converting command from data received by the data communication section 4, the data extracting section 6 notifies, in accordance with the image converting command, the image data processing section 11 of display control information, which is a concrete image converting instruction. In accordance with the display control information, the image data processing section 11 converts image data received by the image broadcasting receiving section 32. Then, the image data processing section 11 sends the converted image data to the memory section 10.

Before extracting the image converting command, or when receiving such an instruction as to finish the image converting, the image data processing section 11 carries out no image converting and sends the image data to the memory section 10.

Figure 7:
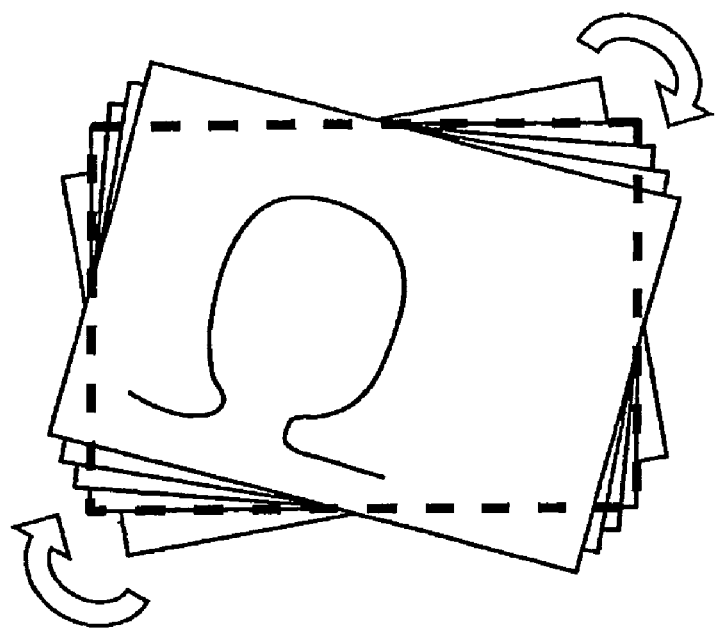
FIG. 7 is a diagram illustrating one example of image data having been subjected to image converting in the mobile phone shown in FIG. 1.

In cases where the image converting command is, e.g., such an instruction as to enlarge an image to a designated size, the display control information is information indicating the designated size to which the image is to be enlarged. In accordance with such information, the image data processing section 11 enlarges the image data to the designated size, and sends the image data to the memory section 10. The display section 21 displays the image data thus enlarged. Note that the image converting is not limited to the above. Examples of the image converting include: (i) image converting for carrying out wavering image display by swinging a screen image little by little as shown in FIG. 7; (ii) image converting for alternating display scale enlarging and display scale reducing; (iii) image converting for blinking a display; (iv) image converting for changing luminance contrast, colors, or tint of a display; and the like.

Further, the image converting may be, e.g., image converting for determining how image data is positioned in the display screen of the display section 21. Specifically, for example, the image data is determined to be positioned as follows:

The image is turned right at an angle of 23°, and is caused to be positioned in the display screen.

The size of the image is reduced to 7/10, and is placed at a screen coordinate of X=64 and Y=120.

The image is turned three times at every display refreshing timing, and is caused to be positioned in a display memory. When the image is turned at an angle of ±45°, the image is turned in reverse three times, and is caused to be positioned in the display memory.

Note that the determination is not limited to these.

The frame data memory 12 stores frame data (combining image data) to be superimposed on (combined with) image data. The following specifically explains a process (combining process) for combining the frame data with the image data. In cases where the data extracting section 6 extracts an image combining command from data received by the data communication section 4, display control information, which is an instruction for starting the combining, is notified to the image data processing section 11 in accordance with the image combining command.

In accordance with the display control information thus notified, the image data processing section 11 reads out frame data to be combined with the image data. In synchronism with the sending of the image data to the memory section 10, the image data processing section 11 sends, to the memory section 10, the frame data, which is to be displayed on a non-transparent portion. The non-transparent portion refers to a portion in which the image data is not displayed. The data thus stored in the memory section 10 is displayed by the display section 21. In this way, the frame combining is attained.

Note that, the above description assumes that one or more types of frame data are stored in the frame data memory 12, and the image data processing section 11 selects and reads out one therefrom in accordance with the display control information. However, the present invention is not limited to this, and the user may view several types of frame data and select one via the inputting section 9. Alternatively, the user may change a frame currently being displayed.

Further, such frame data may be contained in the document data that is received by the data communication section 4 and that is made up of a letter (character) and/or an image, and may be extracted by the data extracting section 6 and be caused to be stored in the frame data memory 12. In this case, information for specifying a frame to be selected is notified to the image data processing section 11 via the inputting section 9. In accordance with the information, the image data processing section 11 reads out the selected frame data from the frame data memory 12.

Note that the combining process may be included in the aforementioned image converting process.

Figure 8:
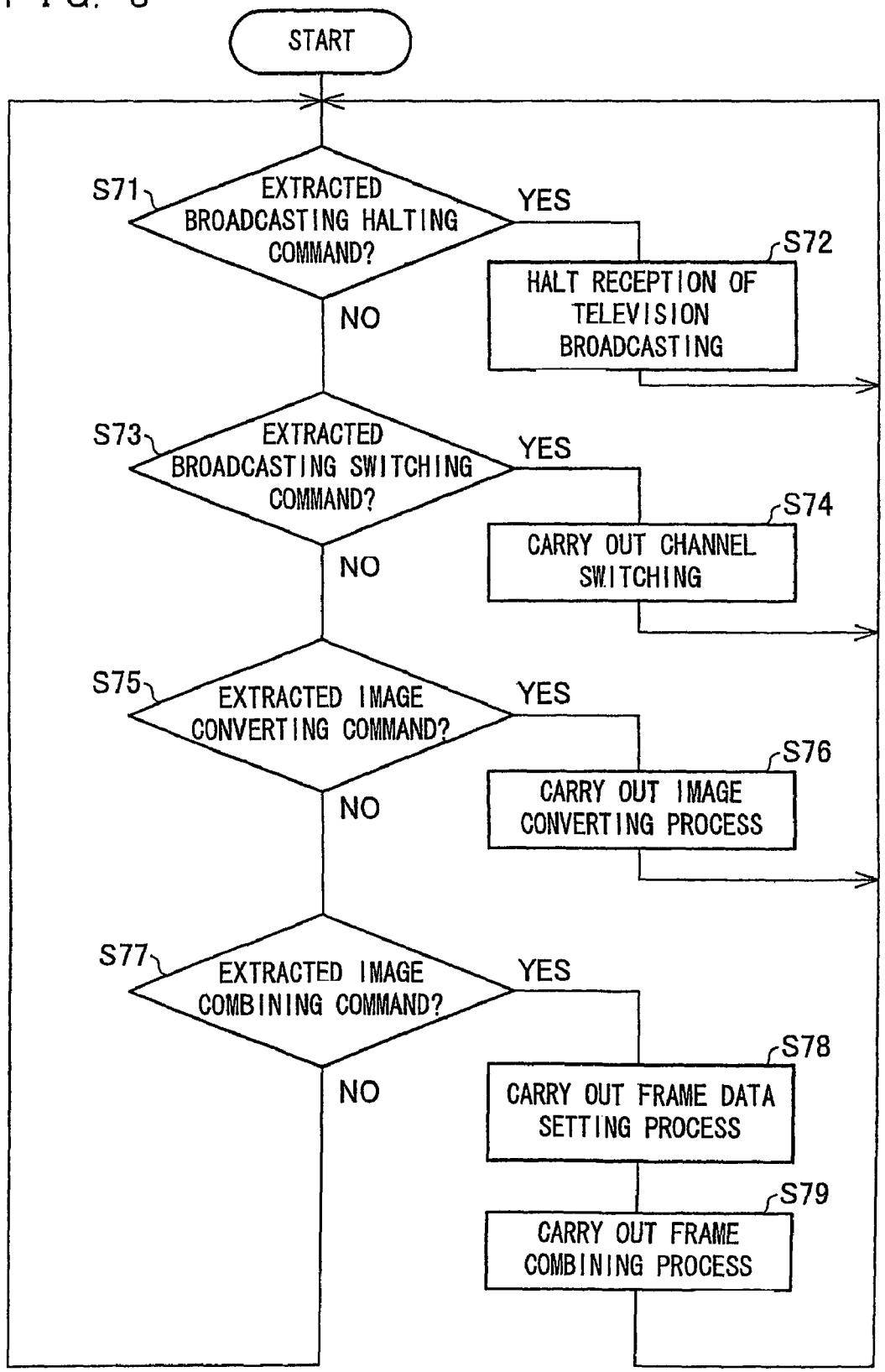
FIG. 8 is a flowchart illustrating process steps of controlling reception of a television broadcasting in the mobile phone shown in FIG. 6.

Explained next is a flow of the image data processing in the mobile phone 100, with reference to a flowchart of FIG. 8.

Firstly, in S71, it is judged whether or not the data extracting section 6 has extracted a broadcasting halting command from data received by the data communication section 4. In cases where the broadcasting halting command has been extracted therefrom (YES in S71), the sequence goes to S72. In S72, the reception of the broadcasting is halted, and then the sequence goes back to S71. In cases where it is judged in S71 that no broadcasting halting command has been extracted (NO in S71), the sequence goes to S73.

In S73, it is judged whether or not the data extracting section 6 has extracted a broadcasting switching command from the data received by the data communication section 4. In cases where the broadcasting switching command has been extracted therefrom (YES in S73), the sequence goes to S74. In S74, a channel is switched from one to another and a television broadcasting of the channel is received, and then the sequence goes back to S71. In cases where it is judged in S73 that no broadcasting switching command has been extracted (NO in S73), the sequence goes to S75.

In S75, it is judged whether or not the data extracting section 6 has extracted an image converting command from the data received by the data communication section 4. In cases where the image converting command has been extracted therefrom (YES in 575), the sequence goes to S76. In S76, the image converting process is carried out, and then the sequence goes back to S71. In cases where it is judged in S75 that no image converting command has been extracted (NO in S75), the sequence goes to S77.

In S77, it is judged whether or not the data extracting section 6 has extracted an image combining command from the data received by the data communication section 4. In cases where the broadcasting combining command has been extracted therefrom (YES in S77), the sequence goes to S78. In cases where it is judged in S77 that no image combining command has been extracted, the sequence goes back to S71, and the above processes are repeated.

In S78, a process for setting frame data is carried out. Specifically, in cases where the data received by the data communication section 4 includes frame data in S77, a process of storing the frame data in the frame data memory 12 is carried out. On the other hand, in cases where the data received by the data communication section 4 does not include any frame data, no process is carried out. In other words, no frame data is set in this case. Then, the sequence goes to S79.

Alternatively in S78, the data extracting section 6 generates display control information for specifying, among one or more types of frame data stored in the frame data memory 12, frame data to be read out by the image data processing section 11. The generation of the display control information is carried out by the data extracting section 6 in accordance with the image combining command.

In S79, in accordance with the image combining command received in S77, the image data processing section 11 reads out, from the frame data memory 12, the frame data to be combined with the image data. Then, the combining process is carried out. The image data having been subjected to the combining process is displayed on the display section 21. Then, the sequence goes back to S71.

According to such a flow, the image data processing is carried out. Note that none of S71, S73, S75, and S77 needs to be carried out prior to the others, so that the order of S71, S73, S75, and S77 can be changed arbitrarily.

Figure 9:
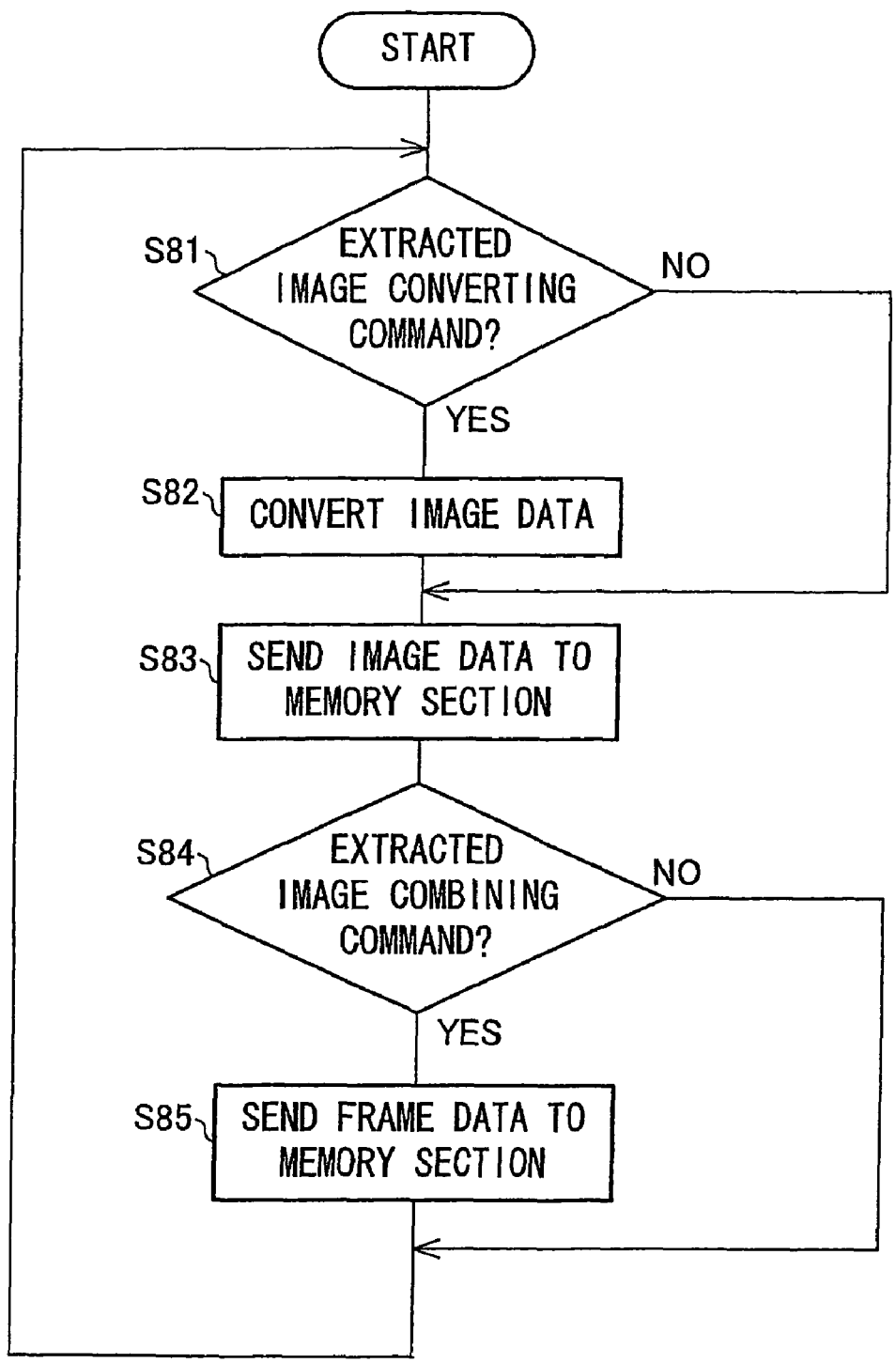
FIG. 9 is a flowchart illustrating process steps carried out in cases where the image converting process and an image combining process are carried out in series in the mobile phone shown in FIG. 6.

Explained next is a flow of the process carried out by the image data processing section 11, with reference to a flowchart shown in FIG. 9.

In S81, it is judged whether or not the data extracting section 6 has extracted an image converting command from data received by the data communication section 4. In cases where an image converting command has been extracted (YES in S81), the sequence goes to S82. In S82, the image data processing section 11 carries out the image converting process, and then the sequence goes to S83. In cases where it is judged in S81 that no image converting command has been extracted (NO in S81), the sequence goes to S83.

Carried out in S83 is sending of the image data to the memory section 10. In cases where it was judged in S81 that the image converting command has been extracted and where the image converting process was carried out in S82, the converted image data is caused to be stored in the memory section 10. In cases where it was judged in S81 that no image converting command has been extracted, unconverted image data is caused to be stored in the memory section 10. Then, the sequence goes to S84.

In S84, it is judged whether or not the data extracting section 6 has extracted an image combining command from the data received by the data communication section 4. In cases where it is judged in S84 that no image combining command has been extracted (NO in S84), the sequence goes back to S81. On the other hand, in cases where it is judged in S84 that an image combining command has been extracted (YES in S84), the sequence goes to S85.

In S85, the image data processing section 11 reads out, from the frame data memory 12, frame data corresponding to the non-transparent portion of the display section 21, and then the image data processing section 11 sends the frame data to the memory section 10. In cases where the memory section 10 stores the data having been subjected to the image converting, the frame data is combined with the image data having been subjected to the image converting. On the other hand, in cases where the memory section 10 stores the data having not been subjected to the image converting, the frame data is combined with the image data having not been subjected to the image converting. Then, the sequence repeats from S81. Note that the processes indicated by the flow are carried out by the image data processing section 11 within one period (one frame period, one vertical scanning period, or the like) of a display of a television broadcasting.

By carrying out the above processes, image data can be converted, e.g., as shown in FIG. 10 (reduced in the case of FIG. 10) and frame data can be superimposed on the image data.

Here, each of the aforementioned mobile phones 1 and 100 can be configured based on a versatile computer. In other words, each of the mobile phones 1 and 100 has a structure in which a CPU (central processing unit), a ROM (read only memory), a RAM (random access memory), a memory apparatus (recording medium), inputting devices such as a key and a button, outputting devices such as a monitor and a speaker, and a network connecting device are connected to one another via an internal bus. The CPU executes instructions of programs (a control program of an information processing device, and a control program of an authentication device) for realizing respective functions. The ROM stores a boot logic. The RAM expands each of the programs. The memory apparatus is a nonvolatile memory or the like for storing the program and various types of database. The network connecting device connects each of the mobile phones 1 and 100 to an external network.

Further, each of the functions of the mobile phones 1 and 100 of the present invention can be realized by causing the CPU to read out and execute program codes (executable code program, intermediate code program, and source program) of a control program for realizing respective functions of the above sections, which program codes are recorded in a computer-readable recording medium supplied to the mobile phone 1.

Specifically, the broadcasting receiving control section 5 and the data extracting section 6 each provided in the mobile phone 1, and the broadcasting receiving control section 5, the data extracting section 6, and the image data processing section 11 each provided in the mobile phone 100, and the like are realized by causing the CPU or the like to execute a predetermined program stored in the mobile phone's memory (not shown). Note that the blocks may be partially or wholly constituted by hardware logic.

The recording medium for supplying the program codes can be arranged such that it can be separated from the system or the apparatus. Further, the recording medium may be a medium held fixedly so that it is capable of supplying the program codes. In addition, the recording medium may be installed in the system or the apparatus so that the program codes recorded therein can be directly read out by the computer, or may be installed so that the program codes can be read out via a program reading device which is connected to the system or the apparatus as an external storage unit.

For example, as the above recording medium, applicable are: a tape such as magnetic tape and a cassette tape; a disk including a magnetic disk such as floppy disk and hard disk and optical disk such as CD-ROM, MO, MD, DVD, and CD-R; a card such as IC card (including memory card) and optical card; and a semiconductor memory such as mask ROM, EPROM, EEPROM, and flash ROM.

Further, the program codes may be recorded so that the computer can read out them from the recording medium for direct execution, or may be recorded so that after the program codes are transferred from the recording medium to a program storage area of a main storage, the computer can read out them from the main storage for execution.

Further, the system or the apparatus may be so arranged as to be connectable to a communication network such that the program codes are supplied via the communication network. The communication network to be used is not particularly limited. Specific examples of the communication network includes the Internet, intranet, extranet, LAN, ISDN, VAN, CATV network, virtual private network, telephone communication network, mobile communication network, satellite communication network, and the like.

Further, the transmission medium constituting the communication network is not particularly limited. Specific examples thereof are: (i) a wired channel using an IEEE 1394, a USB (universal serial bus), a power-line communication, a cable TV line, a telephone line, a ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program codes, or (ii) a form of a series of data signals.

Note that, a program for reading out the program codes from the recording medium to store them in the main storage and a program for downloading the program codes via the communication network are stored in advance in the system or the apparatus so that they can be executed by the computer.

The following describes the other features of the present invention.

(a) In addition to the above structure, the information communication terminal apparatus according to the present invention may be arranged such that: the data extracting means extracts a predetermined broadcasting starting command from the data received by the data communication means, and the broadcasting receiving control means controls the broadcasting receiving section in accordance with the broadcasting starting command such that the broadcasting receiving section starts reception of the broadcasting signal.

According to the structure, the broadcasting starting command sending side can control the start of the reception of the broadcasting signal in the information communication terminal apparatus. That is, when a broadcasting signal sending side would like to cause the user of the information communication terminal apparatus to view a broadcasting, the broadcasting signal sending side merely sends the broadcasting starting command so as to cause the information communication terminal apparatus of the user to start receiving the broadcasting.

(b) In addition to the above structure, the information communication terminal apparatus according to the present invention may be arranged such that: the data extracting means extracts a predetermined broadcasting halting command from the data received by the data communication means, and the broadcasting receiving control means controls the broadcasting receiving section in accordance with the broadcasting halting command such that the broadcasting receiving section halts reception of the broadcasting signal.

According to the above structure, the broadcasting halting command sending side can control the halt of the reception of the broadcasting signal in the information communication terminal apparatus. That is, when a broadcasting signal sending side would like to cause the user of the information communication terminal apparatus to stop viewing a broadcasting, the broadcasting signal sending side merely sends the broadcasting halting command so as to halt the broadcasting in the information communication terminal apparatus of the user.

(c) In addition to the above structure, the information communication terminal apparatus according to the present invention may be arranged such that: the data extracting means extracts a predetermined broadcasting switching command from the data received by the data communication means, and the broadcasting receiving control means controls the broadcasting receiving section in accordance with the broadcasting switching command such that a broadcasting channel is switched to another broadcasting channel and a broadcasting signal of the another broadcasting channel is received.

According to the above structure, the broadcasting switching command sending side can control the broadcasting channel switching to the other broadcasting channel. That is, when a broadcasting signal sending side would like to cause the user of the information communication terminal apparatus to view (i) a broadcasting different from (ii) a broadcasting being currently viewed, the broadcasting signal sending side merely sends the broadcasting switching command so as to switch to the channel of the broadcasting (i) in the information communication terminal apparatus of the user.

(d) In addition to the above structure, the information communication terminal apparatus according to the present invention may further include: an apparatus state detecting section for detecting a current state of the information communication terminal apparatus, wherein: when the apparatus state detecting section detects that the information communication terminal apparatus is in a predetermined state, the broadcasting receiving control means controls the broadcasting receiving section such that the broadcasting receiving section receives the broadcasting signal.

According to the above structure, the halting of the reception of the broadcasting signal, and the reception of the broadcasting signal can be carried out in accordance with the state of the information communication terminal apparatus. For example, the following effect can be exhibited in cases where the information communication terminal apparatus is a foldable mobile phone and where the apparatus state detecting section detects whether or not the body of the information communication terminal apparatus is not folded (unfolded). That is, the broadcasting signal is received when the body of the mobile phone is unfolded, and no broadcasting signal is received when the body of the mobile phone is folded, with the result that unwanted broadcasting signal reception can be prevented.

(e) In addition to the above structure, the information communication terminal apparatus according to the present invention may further include: a reception time measuring section for measuring time having been elapsed since the broadcasting receiving section started the reception of the broadcasting signal; and an inputting section for receiving a user's inputting operation, wherein: in cases where the inputting section does not receive a predetermined inputting operation until a predetermined time has elapsed since the broadcasting receiving section started the reception of the broadcasting signal in accordance with the broadcasting starting command, the broadcasting receiving control section controls the broadcasting receiving section such that the broadcasting receiving section halts the reception of the broadcasting signal.

According to the structure, in cases where no inputting operation is carried out after the passage of the predetermined time, the reception of the broadcasting signal can be halted. If the user carries out an inputting operation, the reception of the broadcasting signal is never halted. This makes it possible to prevent unwanted broadcasting signal reception.

(f) In addition to the above structure, the information communication terminal apparatus according to the present invention may further include: a combining image memory section for storing combining image data, wherein: the data extracting means extracts a predetermined image combining command from the data received by the data communication means, and the image processing section carries out an image process with respect to the image data by using the combining image data read out from the combining image memory section, in accordance with the image combining command.

According to the structure, when the image combining command is contained in the data, the image process using the combining image data can be carried out with respect to the image data to be displayed on the display section. The image process using the combining image data may be, e.g., (i) a process of framing, by the combining image data, the image data obtained in accordance with the broadcasting signal; (ii) a process of superimposing the combining image data on the image data; or (iii) a process of combining the combining image data with the image data.

(g) In addition to the above structure, the information communication terminal according to the present invention may further include: a broadcasting receiving control means for controlling, in accordance with a predetermined broadcasting starting command extracted by the data extracting means from the data received by the data communication means, the broadcasting receiving section such that the broadcasting receiving section receives the broadcasting signal.

According to the above structure, in cases where the broadcasting starting command is contained in the broadcasting control command in addition to either the image converting command or the image combining command, the reception of the broadcasting signal can be carried out in accordance with the broadcasting starting command. With this, at least one of the image data, the audio data, and the teletext broadcasting data can be outputted to the outputting section without the user's operation, i.e., automatically.

Note that: a structure described in a claim may be combined with any structures described in the other claims as required. There is no limitation in combinations of the respective structures described in the claims.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Further, the technical scope of the present invention encompasses an embodiment obtained by arbitrarily combining the respective technical means described in the above embodiments.

INDUSTRIAL APPLICABILITY

It is particularly preferable to apply the present invention to a mobile communication terminal apparatus etc., having a television broadcasting receiving function, such as a PDC (personal digital cellular) and a PDA (personal digital assistant).

The invention claimed is:

1. A broadcasting receiving apparatus, comprising:
a broadcasting receiving section for receiving a broadcasting signal from outside the broadcasting receiving apparatus;
a data extracting section for extracting predetermined information from data contained in the broadcasting signal received by the broadcasting receiving section or from data received by a data communication section for carrying out data communication;
a broadcasting receiving control section for controlling the broadcasting receiving section based on the predetermined information; and
a state detecting section for detecting a current physical state as hardware of the broadcasting receiving apparatus,
wherein the broadcasting receiving control section controls the broadcasting receiving section such that the broadcasting receiving section starts reception of a broadcasting signal received based on the predetermined information, and in cases where the state detecting section does not detect that the current physical state is an unfolded state of a body of the broadcasting receiving apparatus within a predetermined period of time from the start of reception of the broadcasting signal, the broadcasting receiving control section controls the broadcasting receiving section such that the broadcasting receiving section halts the reception of the broadcasting signal.

2. The broadcasting receiving apparatus as set forth in claim 1, wherein the predetermined information is a broadcasting control command.

3. A broadcasting receiving method performed by a broadcasting receiving apparatus, comprising:
receiving a broadcasting signal from outside the broadcasting receiving apparatus;
extracting predetermined information from data contained in the broadcasting signal or from data received by a data communication section for carrying out data communication;
controlling a broadcasting receiving section based on the predetermined information; and
detecting a current physical state as hardware of the broadcasting receiving apparatus,
wherein reception of a broadcasting signal is started based on the predetermined information, and in cases where an unfolded state of a body of the broadcasting receiving apparatus is not detected as the current physical state within a predetermined period of time from the start of reception of the broadcasting signal, halting the reception of the broadcasting signal.

4. A broadcasting receiving apparatus controlling program encoded within a computer memory, wherein the broadcasting receiving apparatus as set forth in claim 1 comprises a computer having the computer memory, the program when executed by the computer performs the functions of the respective sections.

* * * * *